United States Patent
Stein et al.

(10) Patent No.: US 6,336,654 B1
(45) Date of Patent: Jan. 8, 2002

(54) INFLATABLE SIDE CURTAIN

(75) Inventors: Russell E. Stein, Leonard; Michael J. White, Jr., Almont, both of MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/458,503

(22) Filed: Dec. 9, 1999

(51) Int. Cl.$^7$ ................................................ B60R 21/22
(52) U.S. Cl. ............................ 280/730.2; 280/730.1; 280/743.1; 280/749
(58) Field of Search ..................... 280/730.2, 730.1, 280/749, 743.1

(56) References Cited

U.S. PATENT DOCUMENTS

| | | | | |
|---|---|---|---|---|
| 5,588,672 A | * | 12/1996 | Karlow et al. ............ | 280/730.2 |
| 5,788,270 A | | 8/1998 | Haland et al. | |
| 5,845,935 A | | 12/1998 | Enders et al. | |
| 5,865,462 A | | 2/1999 | Robins et al. | |
| 5,884,937 A | * | 3/1999 | Yamada .................... | 280/730.2 |
| 5,899,491 A | * | 5/1999 | Tschaeschke ............ | 280/730.2 |
| 6,073,961 A | * | 6/2000 | Bailey et al. ............. | 280/730.2 |
| 6,106,004 A | * | 8/2000 | Heinz et al. ............... | 280/729 |
| 6,129,377 A | * | 10/2000 | Okumura et al. ......... | 280/730.2 |
| 6,231,073 B1 | * | 5/2001 | White, Jr. .................. | 280/730.2 |
| 6,237,937 B1 | * | 5/2001 | Kokeguchi et al. ....... | 280/730.2 |
| 6,244,619 B1 | * | 6/2001 | Satzger ..................... | 280/730.2 |

FOREIGN PATENT DOCUMENTS

| | | |
|---|---|---|
| DE | 19743626 | 4/1998 |
| EP | 0847904 | 6/1998 |
| GB | 2327066 | 1/1999 |
| GB | 2351266 A | 12/2000 |
| GB | 2351266 | 12/2000 |
| WO | 9626087 | 8/1996 |
| WO | 9807598 | 2/1998 |

* cited by examiner

Primary Examiner—Paul N. Dickson
Assistant Examiner—Deanna Draper
(74) Attorney, Agent, or Firm—Tarolli, Sundheim, Covell, Tummino & Szabo L.L.P.

(57) ABSTRACT

Apparatus (10) for helping to protect an occupant of a vehicle (12) comprises an inflatable vehicle occupant protection device (14). The protection device (14) is inflatable away from a vehicle roof (18) into a position between a side structure (16) of the vehicle (12) and a vehicle occupant. An inflator (24) provides inflation fluid for inflating the protection device (14). The protection device (14) comprises overlying panels (40 and 42) that define an inflatable volume, and first and second connections (60 and 62) that interconnect the overlying panels. The first connection (60) has a first midpoint (70) and first and second portions (72 and 74) that extend from the first midpoint toward a first end portion (76) of the protection device (14). An angle (A) is formed between the first and second portions (72 and 74). The second connection (62) have a second midpoint (80) and third and fourth portions (82 and 84) that extend from the second midpoint (80) toward a second end portion (86) of the protection device (14) opposite the first end portion (76). An angle (B) is formed between the third and fourth portions (82 and 84).

19 Claims, 2 Drawing Sheets

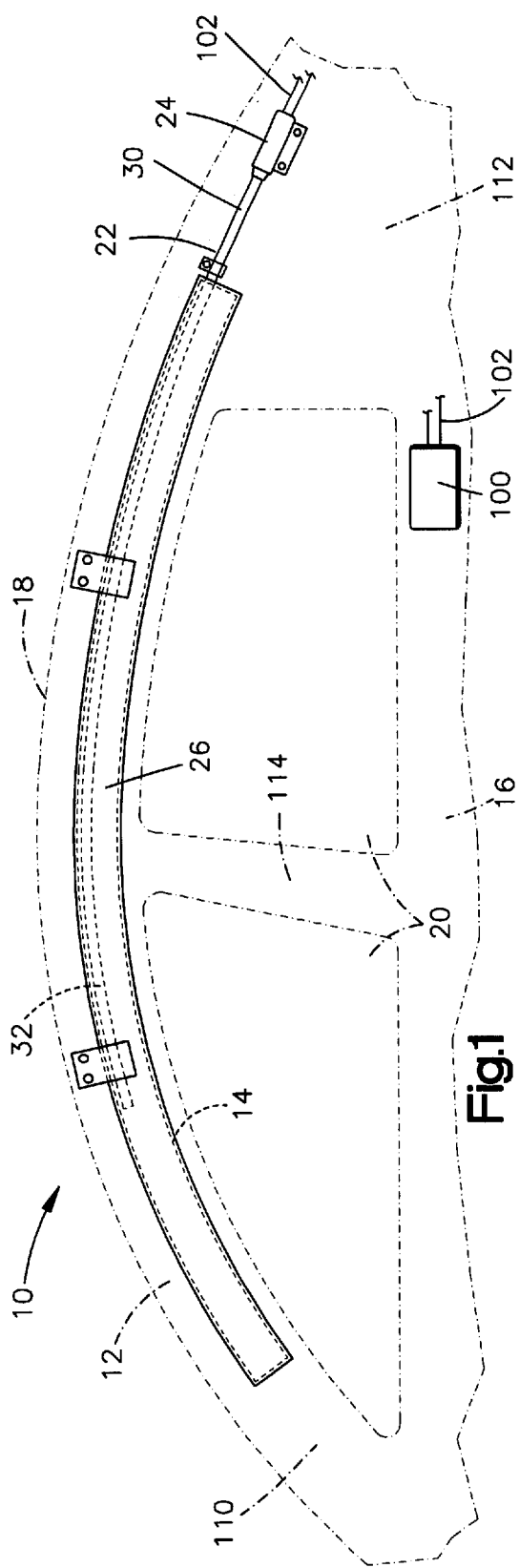

INFLATABLE SIDE CURTAIN

FIELD OF THE INVENTION

The present invention relates to an inflatable vehicle safety apparatus for helping to protect a vehicle occupant in the event of a side impact to a vehicle and/or a vehicle rollover.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable curtain that inflates from the roof of the vehicle downward inside the passenger compartment between a vehicle occupant and the side structure of the vehicle in the event of a side impact or rollover. A known inflatable curtain is inflated from a deflated condition by inflation fluid directed from an inflator to the inflatable curtain through a fill tube.

SUMMARY OF THE INVENTION

The present invention relates to an apparatus for helping to protect an occupant of a vehicle that has a side structure and a roof. The apparatus includes an inflatable vehicle occupant protection device that is inflatable away from the vehicle roof into a position between the side structure of the vehicle and a vehicle occupant. An inflation fluid source provides inflation fluid for inflating the inflatable vehicle occupant protection device. The inflatable vehicle occupant protection device, when inflated, has a perimeter at least partially defined by upper and lower edges and has first and second portions spaced apart along the upper and lower edges.

The inflatable vehicle occupant protection device comprises overlying panels that define an inflatable volume, and first and second connections that interconnect the overlying panels within the perimeter. The first connection has a first midpoint and first and second portions that extend from the first midpoint toward a first end portion of the inflatable vehicle occupant protection device. The first and second portions form an angle between the first and second portions. The second connection has a second midpoint and third and fourth portions that extend from the second midpoint toward a second end portion of the inflatable vehicle occupant protection device opposite the first end portion. The third and fourth portions form an angle between the third and fourth portions.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic view of an inflatable vehicle safety apparatus illustrating the safety apparatus in a deflated condition;

FIG. 2 is a schematic view of the vehicle safety apparatus of FIG. 1 in an inflated condition.

DESCRIPTION OF PREFERRED EMBODIMENTS

Figure 3:
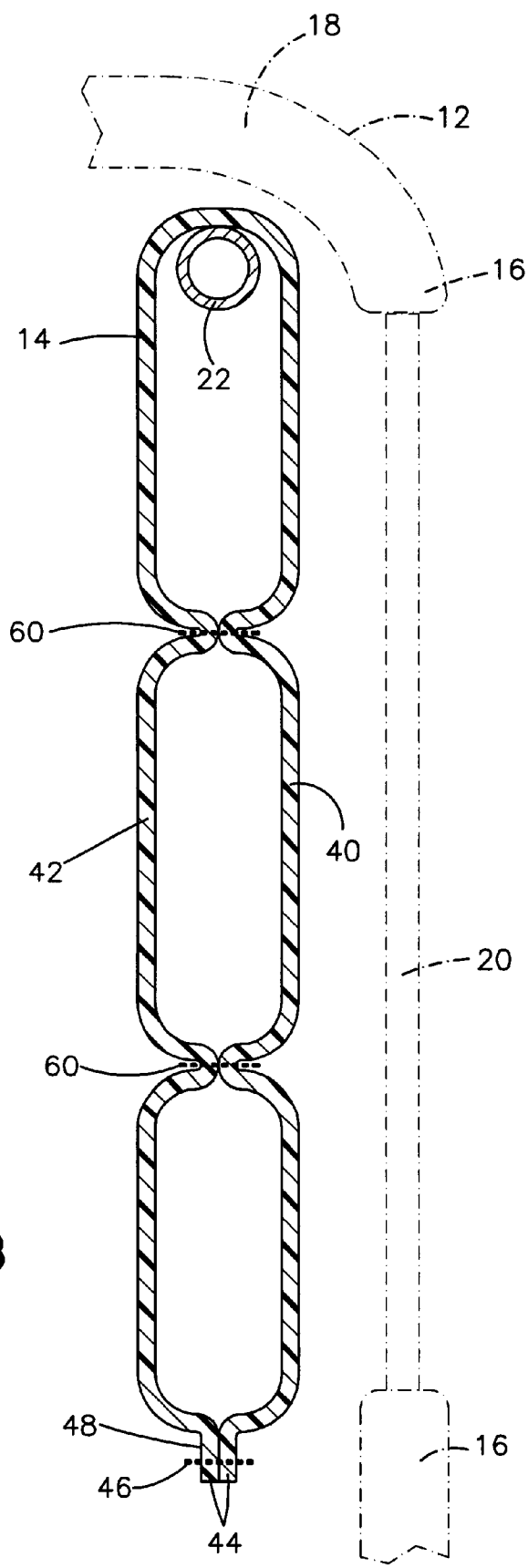
FIG. 3 is a sectional view of the vehicle safety apparatus taken generally along line 3—3 in FIG. 2.

As representative of the present invention, a vehicle safety apparatus 10 helps to protect an occupant of a vehicle 12. As shown in FIGS. 1 and 2, the safety apparatus 10 includes an inflatable vehicle occupant protection device in the form of an inflatable curtain 14 that is mounted adjacent to the side structure 16 of the vehicle 12 and a roof 18 of the vehicle. The side structure 16 of the vehicle 12 includes side windows 20. An inflator 24 is connected in fluid communication with the inflatable curtain 14 through a fill tube 22.

The fill tube 22 has a first end portion 30 for receiving fluid from the inflator 24. The fill tube 22 has a second end portion 32 disposed in the inflatable curtain 14. The second end portion 32 of the fill tube 22 has a plurality of openings (not shown) that provide fluid communication between the fill tube 22 and the inflatable curtain 14. It will be recognized by those skilled in the art that the fill tube 22 may be omitted and the inflator 24 may be connected in direct fluid communication with the inflatable curtain 14. In such a configuration, the inflator 24 would be connected to an end of the inflatable curtain 14 or to a location on the curtain between the ends of the curtain.

The inflator 24 contains a stored quantity of pressurized inflation fluid (not shown) in the form of a gas to inflate the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid. In fact, the inflator 24 could be of any suitable type or construction for supplying a medium for inflating the inflatable curtain 14.

The safety apparatus 10 includes a housing 26 (FIG. 1) that stores the inflatable curtain 14 in a deflated condition. The fill tube 22, the deflated inflatable curtain 14, and housing 26 have an elongated configuration and extend along the vehicle roof 18 and along the side structure 16 of the vehicle 12 above the side windows 20.

As best illustrated in FIG. 3, the inflatable curtain 14 comprises first and second panels 40 and 42 that are arranged in an overlying manner. Overlapping portions 44 of the first and second panels 40 and 42 are secured together by stitching 46 (FIGS. 2 and 3) that extends along a portion of the perimeter 48 of the inflatable curtain 14. For clarity, the size of the stitching 46 is exaggerated in FIG. 3.

In the illustrated embodiment, the inflatable curtain 14 (FIG. 3) is formed from a sheet of material that is folded over to form the overlying first and second panels 40 and 42. It will be recognized by those skilled in the art, however, that the inflatable curtain 14 could have alternative constructions. For example, the first and second panels 40 and 42 could be formed from separate sheets of material arranged in an overlying manner and secured together by stitching 46 that extends around the entire perimeter 48 of the panels to form the inflatable curtain 14. The first and second panels 40 and 42 may also be woven together around their perimeters to form the inflatable curtain 14.

The first and second panels 40 and 42 are constructed of a fabric, such as nylon, that is coated with a gas impermeable material, such as urethane or silicone, to form an inflatable volume. The inflatable curtain 14 thus has a substantially air-tight construction. Other materials, such as elastomers, plastic films, or combinations thereof may also be used to construct the inflatable curtain 14. The first and second panels 40 and 42 may also be formed of single or multi-layered sheets of material.

The perimeter 48 (FIG. 2) of the inflatable curtain 14 is defined by upper and lower edges 50 and 52, respectively, of the curtain and horizontally spaced front and rear edges 54 and 56, respectively, of the curtain. The front and rear edges 54 and 56 of the inflatable curtain 14 extend from the upper edge 50 to the lower edge 52 of the curtain. Although the front and rear edges 54 and 56 of the inflatable curtain 14 are illustrated as being generally vertical, the front edge of the curtain 14, in particular, could be formed by extending the upper and lower edges 50 and 52 until they intersect.

The inflatable curtain 14 includes first and second connections 60 and 62, located within the perimeter 48 of the curtain, that interconnect the first and second panels 40 and 42. The first and second connections 60 and 62 comprise seams that are formed by known means, such as stitching or weaving. For clarity, the size of the connections 60 is exaggerated in FIG. 3. Alternative means (not shown) such as dielectric sealing, ultrasonic bonding, heat sealing, and adhesives may also be used to form the connections 60 and 62. The first and second connections 60 and 62 may also comprise tethers that correspond to the shape of the first and second connections and are sewn or otherwise secured to the panels 40 and 42 to interconnect the panels.

In the illustrated embodiment, there are two first connections 60 and two second connections 62. The first and second connections 60 and 62 are grouped into two pairs 64 that are spaced horizontally apart from each other. Each of the pairs 64 includes one first connection 60 and one second connection 62. The first and second connections 60 and 62 are described below in terms of a single pair 64 in order to avoid confusion.

The first connection 60 has a first midpoint 70 and first and second portions 72 and 74, respectively, that extend linearly from the first midpoint toward a first end portion 76 of the inflatable curtain 14. In the illustrated embodiment, the first end portion 76 is adjacent the front edge 54 of the inflatable curtain 14. The first and second portions 72 and 74 form an angle A between the first and second portions. The vertex of the angle A is positioned on the first midpoint 70 of the first connection 60. In the illustrated embodiment, the angle A is an acute angle. The angle A, however, may be an acute, obtuse, or right angle.

The second connection 62 has a second midpoint 80 and third and fourth portions 82 and 84, respectively, that extend linearly from the second midpoint toward a second end portion 86 of the inflatable curtain 14, opposite the first end portion 76. In the illustrated embodiment, the second end portion 86 is adjacent the rear edge 56 of the inflatable curtain 14. The third and fourth portions 82 and 84 form an angle B between the third and fourth portions. The vertex of the angle B is positioned on the second midpoint 80 of the second connection 62. The angle B may be an acute, obtuse, or right angle. The angle B is preferably equal to the angle A.

The first and second midpoints 70 and 80 are preferably both located an equal distance from the lower edge 52 of the inflatable curtain 14 and, thus, are horizontally aligned. The first and second portions 72 and 74 are preferably of equal length. The third and fourth portions 82 and 84 are also preferably of equal length. The length of the first and second portions 72 and 74 is preferably equal to the length of the third and fourth portions 82 and 84.

The upper and lower edges 50 and 52 and the front and rear edges 54 and 56 of the inflatable curtain 14 define an inflatable chamber 90 that surrounds the first and second connections 60 and 62. In the illustrated embodiment, the chamber 90 surrounds both pairs 64 of first and second connections 60 and 62. The inflatable curtain 14 may include a seam 92 that defines a non-inflatable portion 94 of the curtain. The seam 92 may also help to define the overall shape of the chamber 90.

It will be recognized by those skilled in the art that the first and second connections 60 and 62 may have alternative configurations. For example, in the illustrated embodiment, there are two pairs 64 of connections. The inflatable curtain 14 could, however, include a single pair of connections or a plurality of pairs of connections. Also, the lengths of the first and second connections 60 and 62 could be increased or decreased.

The vehicle 12 includes a sensor mechanism 100 (shown schematically in FIGS. 1 and 2) for sensing a side impact to the vehicle 12 and/or a rollover of the vehicle 12. The sensor mechanism 100 actuates the inflator 24 in response to the sensing of a side impact or a vehicle rollover.

In the event of a rollover of the vehicle or a side impact to the vehicle 12 of a magnitude greater than a predetermined threshold value, the sensor mechanism 100 provides an electrical signal over lead wires 102 to the inflator 24. The electrical signal causes the inflator 24 to be actuated in a known manner. The inflator 24 discharges fluid under pressure into the fill tube 22. The fill tube 22 directs the fluid into the inflatable curtain 14.

The inflatable curtain 14 inflates under the pressure of the inflation fluid from the inflator 24. The housing 26 (FIG. 1) opens and the inflatable curtain 14 (FIG. 2) inflates away from the roof 18 in a downward direction as shown in the drawings and in a downward direction with respect to the direction of forward travel of the vehicle 12 into the position illustrated in FIG. 2.

The inflatable curtain 14, when inflated, extends along the side structure 16 of the vehicle 12 and is positioned between the side structure and any occupant of the vehicle. When the inflatable curtain 14 is in the inflated condition, the first panel 40 is positioned adjacent the side structure 16 of the vehicle 12. The upper edge 50 is positioned adjacent to the intersection of the roof 18 and the side structure 16 of the vehicle 12. The front edge 54 is positioned adjacent to an A pillar 110 of the vehicle 12. The rear edge 56 of the inflatable curtain 14 is positioned adjacent to a C pillar 112 of the vehicle 12. The inflatable curtain 14 extends between the A pillar 110 and the C pillar 112 of the vehicle 12 and overlies at least a portion of the A pillar, C pillar, and a B pillar 114 of the vehicle.

It will be recognized by those skilled in the art that the inflatable curtain 14 may have alternative configurations. For example, in the illustrated embodiment, the inflatable curtain 14 extends between the A pillar 110 and the C pillar 112 of the vehicle 12. The inflatable curtain 14 could, however, extend between the A pillar 110 and the B pillar 114 only or between the B pillar and the C pillar 112 only. Also, in a vehicle having A, B, C, and D pillars (not shown), the inflatable curtain 14 could, when inflated, extend between the A pillar and the D pillar.

The inflatable curtain 14, when inflated, helps to protect a vehicle occupant in the event of a vehicle rollover or a side impact to the vehicle 12. When the curtain 14 is inflated, the inflatable chamber 90 is positioned along the side structure 16 of the vehicle 12. The first and second connections 60 and 62 help to limit the thickness and volume of the inflated inflatable curtain 14. The chamber 90 helps to absorb the energy of impacts with the inflatable curtain 14 and helps to distribute the impact energy over a large area of the curtain.

From the above description of the invention, those skilled in the art will perceive improvements, changes and modifications. For example, the number of pairs 64 of first and second connections 60 and 62 could vary depending upon the length of the inflatable curtain 14 along the side structure 16 of the vehicle 12. For example, if the inflatable curtain extended from the A pillar and B pillar of the vehicle, only one pair of connections may be incorporated in the curtain, whereas if the curtain extended from the A pillar and the C pillar or D pillar, two or more pairs of connections may be incorporated in the curtain. Such improvements, changes and modifications within the skill of the art are intended to be covered by the appended claims.

Having described the invention, the following is claimed:

1. Apparatus for helping to protect an occupant of a vehicle that has a side structure and a roof, said apparatus comprising:

an inflatable vehicle occupant protection device that is inflatable away from the vehicle roof into a position between the side structure of the vehicle and a vehicle occupant; and an inflation fluid source that provides inflation fluid for inflating said inflatable vehicle occupant protection device;

said inflatable vehicle occupant protection device, when inflated, having a perimeter at least partially defined by upper and lower edges and having first and second end portions spaced apart horizontally along the upper and lower edges;

said inflatable vehicle occupant protection device comprising overlying panels that define an inflatable volume, and first and second connections interconnecting said overlying panels within said perimeter;

said first connection having a first midpoint and first and second portions extending from said first midpoint toward a first end portion of said inflatable vehicle occupant protection device, said first and second portions forming an angle between said first and second portions; and said second connection having a second midpoint and third and fourth portions extending from said second midpoint toward a second end portion of said inflatable vehicle occupant protection device opposite said first end portion, said third and fourth portions forming an angle between said third and fourth portions.

2. Apparatus as defined in claim 1, wherein said first, second, third and fourth portions are linear.

3. Apparatus as defined in claim 1, wherein said first end portion of said inflatable vehicle occupant protection device is at least partially defined by a front edge of said inflatable vehicle occupant protection device, and said second end portion of said inflatable vehicle occupant protection device is at least partially defined by a rear edge of said inflatable vehicle occupant protection device.

4. Apparatus as defined in claim 3, wherein said upper edge, said lower edge, said front edge and said rear edge of said inflatable vehicle occupant protection device define an inflatable chamber that surrounds said first and second connections.

5. Apparatus as defined in claim 1, wherein said midpoints of said first and second connections are spaced apart from each other and positioned an equal distance from said lower edge.

6. Apparatus as defined in claim 1 wherein said angle between said first and second portion and said angle between said third and fourth portions are acute angles.

7. Apparatus as defined in claim 1 wherein said first and second portions of said first connection have equal lengths.

8. Apparatus as defined in claim 1 wherein said third and fourth portions of said second connection have equal lengths.

9. Apparatus as defined in claim 1 wherein said first and second portions of said first connection and said third and fourth portions of said second connection have equal lengths.

10. Apparatus as defined in claim 1, wherein said inflatable vehicle occupant protection device includes a plurality of said first and second connections.

11. Apparatus as defined in claim 1 wherein said first and second connections comprise stitching that interconnects said overlying panels.

12. Apparatus as defined in claim 1 wherein said first and second connections comprise tethers that interconnect said overlying panels.

13. Apparatus as defined in claim 1, wherein said inflatable vehicle occupant protection device is an inflatable curtain having a stored position extending along the side structure adjacent to a roof of the vehicle, said inflatable curtain being inflated away from the vehicle roof into said position between the side structure of the vehicle and a vehicle occupant.

14. Apparatus as defined in claim 13, further including a fill tube having a portion located in said inflatable curtain, said inflation fluid source being in fluid communication with said fill tube, said inflation fluid source, when actuated, providing inflation fluid to said fill tube, said fill tube directing said inflation fluid into said inflatable curtain to inflate said inflatable curtain.

15. Apparatus as defined in claim 13, wherein said inflatable curtain when inflated extends along the side structure of the vehicle between an A pillar and a C pillar of the vehicle.

16. Apparatus as defined in claim 13, wherein said inflatable curtain, when inflated, overlies at least a portion of an A pillar, a B pillar and a C pillar of the vehicle.

17. Apparatus as defined in claim 1, wherein portions of said inflatable vehicle occupant protection device are uninflated when said inflatable curtain is inflated.

18. Apparatus as defined in claim 1, further comprising a sensor for sensing a vehicle condition for which deployment of said inflatable curtain is desired, said sensor actuating said inflation fluid source to provide inflation fluid to inflate said inflatable vehicle occupant protection device.

19. Apparatus as defined in claim 1, wherein said inflation fluid source comprises an inflator which is actuatable to inflate said inflatable vehicle occupant protection device.

* * * * *